United States Patent
Owen

(10) Patent No.: US 6,183,019 B1
(45) Date of Patent: Feb. 6, 2001

(54) CRYOGENIC FLUID CONDUIT COUPLING DEVICE

(75) Inventor: Donald R. Owen, New Orleans, LA (US)

(73) Assignee: Life Science Holdings, Inc., Chicago, IL (US)

(*) Notice: Under 35 U.S.C. 154(b), the term of this patent shall be extended for 0 days.

(21) Appl. No.: 09/039,378

(22) Filed: Mar. 16, 1998

(51) Int. Cl.⁷ ...................................... F16L 35/00
(52) U.S. Cl. ........................ 285/24; 285/332; 285/361; 285/904; 29/428
(58) Field of Search .................... 285/332, 904, 285/360, 361, 376, 375, 396, 401, 402; 29/428, 24, 27

(56) References Cited

U.S. PATENT DOCUMENTS

| | | |
|---|---|---|
| 810,354 * | 1/1906 | Scanlon et al. ................. 285/332 |
| 1,117,762 | 11/1914 | Barcus . |
| 1,744,367 * | 1/1930 | De Loache ..................... 285/361 |
| 3,712,583 | 1/1973 | Martindale et al. . |
| 3,845,974 | 11/1974 | Pelloux-Gervais . |
| 3,885,595 * | 5/1975 | Gibson et al. ................... 285/904 |
| 4,566,489 | 1/1986 | Knapp et al. . |
| 4,566,723 | 1/1986 | Schulze et al. . |
| 4,659,116 * | 4/1987 | Cameron ........................ 285/904 |

FOREIGN PATENT DOCUMENTS 545332   10/1922   (FR) .

* cited by examiner

Primary Examiner—Dave W. Arola
(74) Attorney, Agent, or Firm—Oliff & Berridge, PLC

(57) ABSTRACT

A coupling device can connect two cryogenic fluid conduits in fluid communication without creating a temperature change. The coupling device includes a fluid flow path extending therethrough having a substantially constant cross-sectional area. The coupling device is designed to be easy to connect and disconnect and to provide a secure connection, in particular at low temperature.

16 Claims, 1 Drawing Sheet

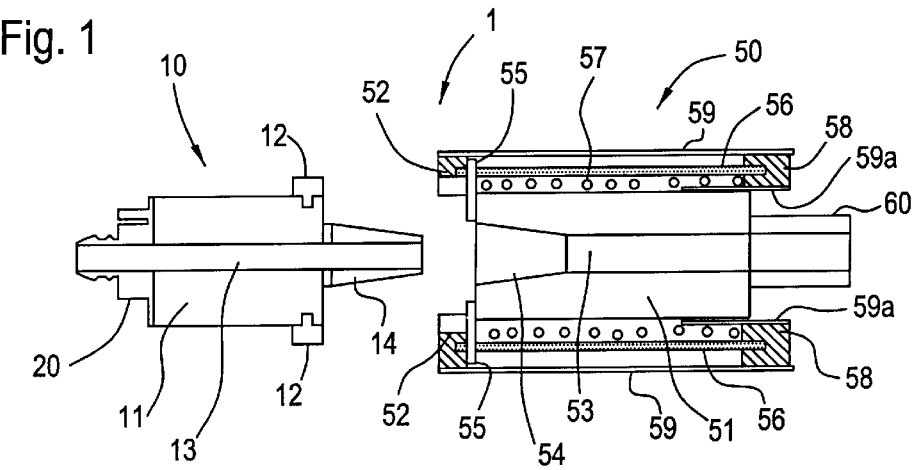
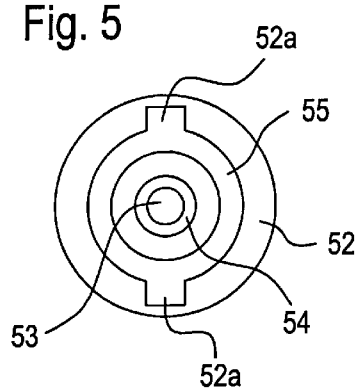
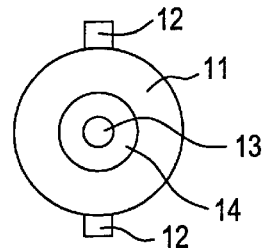
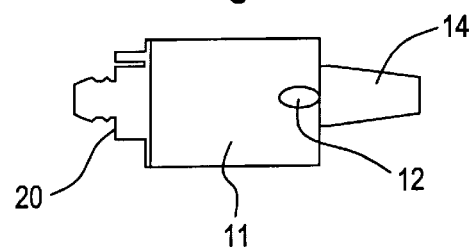
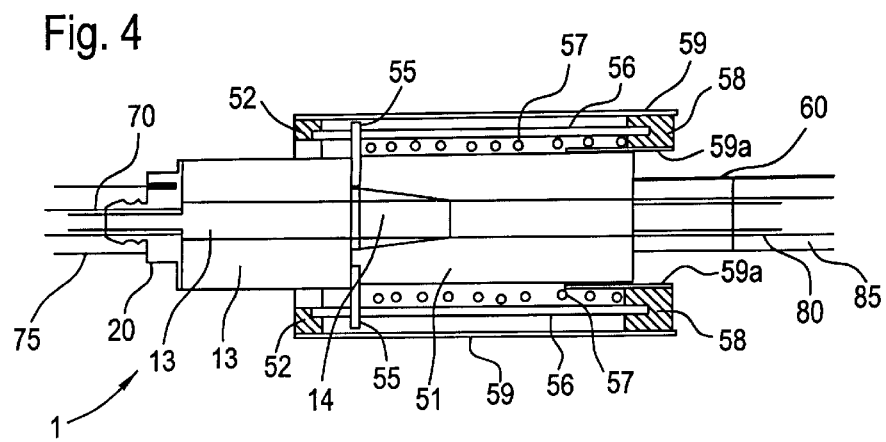

CRYOGENIC FLUID CONDUIT COUPLING DEVICE

BACKGROUND OF THE INVENTION

1. Field of Invention

The invention relates to a cryogenic fluid conduit coupling device for connecting two cryogenic fluid conduits to allow fluid communication therebetween.

2. Description of Related Art

A cryogenic fluid is a fluid capable of producing very low temperatures. Cryogenic fluids, such as, for example, carbon dioxide and nitrogen, have very low sublimation and/or boiling points. They are capable of absorbing very large amounts of heat to produce very low temperatures in adjacent materials when they change from one state to another, for example, from a liquid or solid state to a gaseous state. In addition, when a compressed gaseous cryogenic fluid is allowed to expand, its temperature decreases and the cryogenic fluid is capable of cooling adjacent materials by absorbing heat from the materials as the compressed fluid expands.

Cryogenic fluids can be useful, for example, in heat exchange apparatus, such as that disclosed in simultaneously filed co-pending U.S. application Ser. No. 09/039,443. However, a coupling device is often necessary in order to couple the conduit of the cryogenic fluid source to the heat exchange apparatus.

Many coupling devices are known for coupling two fluid conduits. For example, U.S. Pat. No. 1,117,762 to Barcus discloses a device for connecting a section of a hose or conduit to another section or to a hydrant. The device includes cylindrical outer coupling part 1, which receives a tapered end portion 2" of cylindrical inner coupling part 2. The flow path of the coupling part 1 includes an expansion chamber within which a spring 20 is disposed.

U.S. Pat. No. 4,566,489 to Knapp et al. discloses a hydraulic coupling apparatus for connecting fluid lines of a fluid handling system. The coupling apparatus includes a male coupler 12 and a female coupler 14. Sleeve portion 16 of the female coupler 14 receives tip portion 17 of the male coupler 12 to assemble the couplers together. An expansion chamber is formed within sleeve 16 as a result of engagement of a pair of flanges 31 and 32 provided on the outer surface of the tip portion 17 of the male coupler and stop surfaces 41, 42.

U.S. Pat. No. 4,566,723 to Schulze et al. discloses a coupler for hose lines of high-pressure cleaning equipment and high-pressure spraying equipment. The coupler includes a hose nipple 2 connected to a hose and surrounded by a sleeve 7. A connector piece 22 also connected to a hose is received within sleeve 7 to mate with nozzle 2. Once introduced into the sleeve 7, a helical compression spring 9 pushes the connector piece away from the hose nipple 2 creating an expansion chamber within the hose nipple 2.

Each of the above coupling devices is inadequate for use with cryogenic fluids. Fluctuation in the cross-sectional area of the fluid flow path causes compression and/or expansion of the fluid flowing therethrough. Such compression and/or expansion of the fluid results in cold and hot spots in the fluid flow path, which will structurally weaken the coupling device over time and may cause solidification of the fluid causing blockage of the fluid flow path.

SUMMARY OF THE INVENTION

In view of the foregoing, a coupling device is provided which is capable of connecting two cryogenic fluid conduits in fluid communication. The coupling device includes a fluid flow path extending therethrough having a substantially constant cross-sectional area. The coupling device is preferably formed of a material having low thermal conductivity and high resistivity to low temperature. Further, the coupling device is designed to be easy to connect and disconnect, and to provide a secure connection at low temperatures, in particular.

BRIEF DESCRIPTION OF THE DRAWINGS

These and other aspects and advantages of the invention will become apparent from the following detailed description of preferred embodiments when taken in conjunction with the accompanying drawings, in which:

FIG. 1 is a side cross-sectional view of a preferred embodiment of a device according to the invention;

FIG. 2 is a front view of a male connector portion of the device of FIG. 1;

FIG. 3 is a top view of a male connector portion of the device of FIG. 1;

FIG. 4 is a side cross-sectional view of the device of FIG. 1 shown with male and female connector portions engaged; and FIG. 5 is a front view of a female connector portion of the device of FIG. 1.

DETAILED DESCRIPTION OF PREFERRED EMBODIMENTS

The invention relates to a method and device for easily connecting and disconnecting two cryogenic fluid conduits, and for providing a secure connection, in particular, at low temperatures. The method preferably includes contacting together contact faces of first and second coupling portions. Each of the first and second coupling portions has a fluid flow path with an opening at the respective contact face. The fluid flow paths of the first and second coupling portions are preferably substantially equal in cross-sectional area. The contact faces of the first and second coupling portions are contacted in such a way that the openings are aligned, whereby fluid communication is provided between the first and second coupling portions without creating a temperature change in a cryogenic fluid flowing therethrough. The coupling portions are then secured together.

The contact faces of the first and second coupling portions may be self-guiding with respect to each other to align the openings thereof when brought into contact. Also, the contact faces of the first and second coupling portions may be complementary in shape. Further, the first coupling portion may be a male connector portion and the second coupling portion may be a female connector portion configured to mate with the male connector portion. The first coupling portion may include a main body and a mating part with the fluid flow path extending therethrough, and the second coupling portion may include a main body with the fluid flow path extending therethrough. The second coupling portion may include a first portion complementary in shape to an outer surface of the mating part, which may be frustoconical, of the first coupling portion.

The contact face of the first coupling portion may be biased into contact with the contact face of the second coupling portion. Such biasing may be accomplished by a spring.

The first and second coupling portion may be secured together by rotating one with respect to the other. Also, the method may further include connecting each of the first and second coupling portions to a cryogenic fluid conduit without a change in cross sectional area from the fluid flow path of the cryogenic fluid conduit to the fluid flow path of the respective coupling portion.

The method may be implemented by a device which preferably includes a first coupling portion including a contact face and a fluid path extending therethrough with an opening at the contact face, and a second coupling portion including a contact face and a fluid path extending therethrough with an opening at the contact face. When the contact face of the first coupling portion is brought into contact with the contact face of the second coupling portion, the first coupling portion and the second coupling portion are self-guiding with respect to each other to align the respective openings thereof, whereby fluid communication is provided between the first and second coupling portions without creating a temperature change in a cryogenic fluid flowing therethrough.

The first coupling portion may be a male connector portion and the second coupling portion may be a female connector portion configured to mate with the male connector portion. Further, the first coupling portion may include a main body and a mating part with a fluid flow path extending therethrough, and the second coupling portion may include a main body with a fluid flow path extending therethrough, the second coupling portion having a first portion complementary in shape to an outer surface of the mating part of the first coupling portion.

The fluid flow path of the first coupling portion may have a substantially constant cross sectional area, and the fluid flow path of the second coupling portion may have a substantially constant cross sectional area which is substantially the same as that of the fluid flow path of the first coupling portion. The mating part is preferably frustoconical, but other shapes may also be appropriate.

Each of the first coupling portion and second coupling portion preferably includes a connector part for connecting to a cryogenic fluid conduit without a change in cross sectional area from the fluid flow path of the cryogenic fluid conduit to the fluid flow path of the respective coupling portion. Further, the device is preferably formed of a material having a low thermal conductivity and high resistivity to low temperature, for example, polytetrafluoroethylene.

The device preferably also includes a connector member for holding the contact face of the first coupling portion in contact with the contact face of the second coupling portion, and may include a locking mechanism for holding the first coupling portion in locking engagement with the second coupling portion. The connector member may include a biasing member for biasing the contact face of the first coupling portion into contact with the contact face of the second coupling portion. The biasing member is preferably a spring, but other similar elements may also be appropriate.

The connector member may further include an outer casing disposed around a main body of the second coupling portion, first and second support members attached to the outer casing, at least one guide rod extending between and supported by the first and second support members, and a slide member supported on the at least one guide rods. The locking mechanism may include at least one protrusion disposed on an outer surface of the first coupling portion and at least one cut-out in one of the first and second support members for mating with the at least one protrusion. The spring is preferably disposed around the main body of the second coupling portion and extends between the first and second support members. When the contact face of the first coupling portion is contacted with the contact face of the second coupling portion, the at least one protrusion passes through the at least one cut-out and contacts with the slide member so that the slide member compresses the spring and, when the second coupling portion is then rotated with respect to the first coupling portion so that the at least one protrusion is no longer aligned with the at least one cut-out, the first coupling portion is held in locking engagement with the second coupling portion.

For a general understanding of the features of the invention, reference is made to the drawings. In the drawings, like reference numerals have been used throughout to designate like elements.

FIG. 1 is a side cross-sectional view of a preferred embodiment of a device according to the invention. Each of the elements of the device 1 is preferably made of or coated with a material having low thermal conductivity and high resistivity to low temperatures, such as, for example, polytetrafluoroethylene (e.g., Teflon), or any inert materials such as plastics, which does not become brittle at low temperatures. The device 1 preferably includes a male connector portion 10 and a female connector portion 50. Each of the male connector portion 10 and the female connector portion 50 are connectable to cryogenic fluid conduit (not shown).

As shown in FIG. 1, the male connector portion 10 includes a main body 11. The main body 11 is preferably cylindrical; however, other shapes can also be appropriate, particularly as they may correspond to the shape of a fluid conduit. The main body 11 has attached thereto a conduit connector part 20 and a mating part 14. A fluid flow path, preferably with a uniform cross section, extends through the connector part 20, the main body 11 and the mating part 14. A fluid conduit 75 is preferably attached to the connector part 20 utilizing a metal tube 70 machine pressed to the connector part 20, as shown in FIG. 4, so that there is little or no expansion of the fluid as the fluid passes from the fluid conduit into the fluid flow path of the coupling element. However, other means of connecting a fluid conduit to the connector part 20 may also be appropriate.

The mating part 14 is preferably complementary in shape to and sealingly engages with a fluid flow path entrance of the female connector portion 50 of the device 1. In the embodiment of FIG. 1, the mating part 14 includes an outer surface which is preferably frustoconical. This shape facilitates insertion of the mating part 14 into the complimentary shaped receiving part 54 of the female connector portion 50. However, other shapes can also be appropriate. Protrusions 12 are provided on the outer surface of the main body 11, as shown in FIGS. 1 and 3–4. The protrusions 12 are configured to mate with cut-outs 52a in support member 52 of the female connector portion 50 (see FIG. 5).

The female connector portion 50 includes a main body 51. The main body 51 is preferably cylindrical in shape; however, other shapes can also be appropriate. The main body 51 has attached thereto a cryogenic fluid conduit connector part 60. A fluid conduit 85 is preferably attached to the connector part 60 utilizing a metal tube 80 machine pressed to the connector part 60, as shown in FIG. 4, so that there is little or no expansion of the fluid as the fluid passes from the fluid conduit into the fluid flow path of the coupling element. However, other means of connecting a fluid conduit to the connector part 60 may also be appropriate.

A fluid flow path 53 extends through the main body 51 in the connector part 60. The cross sectional area of the fluid flow path 53 is the same as that of the fluid flow path 13 of the male connector portion 10. As discussed above, the outer surface of the receiving part 54 is preferably complementary in shape to the outer surface of the mating part 14 of the male connector portion 10.

In the preferred embodiment of FIG. 1, the main body 51 is surrounded by an outer casing 59. The outer casing is preferably a hollow tubular member; however, other shapes may also be appropriate. Attached to the outer shell 59 are support members 52, 58. The support members 52, 58 are each preferably circular rings. As previously discussed, the support member 52 has cut outs 52a which are complementary in shape to the protrusions 12 of the male connector portion 10. An inner shell 59a is attached to the support member 58.

Guide rods 56, 56 extend between and are supported by the support members 52, 58. A slide plate 55 is slidably mounted on the guide rods 56, 56. The slide plate 55 is preferably a ring-shaped plate; however, other shapes may also be appropriate. A spring 57 is disposed around the main body 51, preferably disposed between the outer surface of the main body 51 and the guide rods 56, 56 and extending between the support members 52, 58.

To connect the male connector portion 10 and the female connector portion 50, the protrusions 12 are aligned with the cut-outs 52a of the support member 52 and the outer surface of the mating part 14 is brought into contact with the inner surface of the receiving part 54. As the mating part 14 is inserted into the fluid flow path entrance 54, the protrusions 12 pass through the cut-outs 52a contacting the slide plate 55. The slide plate 55 pushes against and compresses the spring 57 as the outer casing 59 and the support members 52, 58 move forward, as shown in FIG. 4. Rotating the male connector portion so that the protrusions 12 are no longer aligned with the cut-outs 52a secures the male connector portion 10 to the female connector portion 50.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A cryogenic fluid conduit coupling device formed of a material having low thermal conductivity and high resistivity to low temperature, comprising:
   a first coupling portion including a first contact face and a fluid path extending through said first coupling portion with a first opening at the first contact face;
   a second coupling portion including a second contact face and a fluid path extending through said second coupling portion with a second opening at the second contact face; said second opening having substantially the same shape and dimensions as said first opening, such that the fluid path in the first and second coupling portions form a continuous fluid path with a constant cross sectional area,
   the first coupling portion and the second coupling portion being configured to be complementary and self-guiding with respect to each other to align the respective openings thereof when the first contact face is brought into contact with the second contact face, whereby fluid communication is provided between the first and second coupling portions in the continuous fluid path without creating a temperature change in a cryogenic fluid flowing therethrough; and
   a connector member for holding the first contact face in contact with the second contact face, wherein the connector member includes a locking and unlocking mechanism for releasably holding the first coupling portion in locking engagement with the second coupling portion and a biasing member that biases the first contact face into contact with the second contact face.

2. The device of claim 1, wherein the first coupling portion comprises a male connector portion and the second coupling portion comprises a female connector portion configured to mate with the male connector portion.

3. The device of claim 2, wherein the male connector portion is frustoconical.

4. The device of claim 2, wherein the connector member is carried by the female connector portion.

5. The device of claim 1, wherein each of the first coupling portion and second coupling portion includes a connector part for connecting to a cryogenic fluid conduit without a change in cross sectional area from a fluid flow path of the cryogenic fluid conduit to the fluid flow path of the respective coupling portion.

6. The device of claim 1, wherein the material is polytetrafluoroethylene.

7. The device of claim 1, wherein the biasing member is a spring.

8. The device of claim 1, wherein the connector member includes a sliding guide supported by one of the first and second coupling portions that axially guides the connector during engagement and disengagement of the connector with the other of the first and second coupling portions.

9. A cryogenic fluid conduit coupling device formed of a material having low thermal conductivity and high resistivity to low temperature, comprising:
   a first coupling portion including a first contact face and a fluid path extending through said first coupling portion with a first opening at the first contact face;
   a second coupling portion including a second contact face and a fluid path extending through said second coupling portion with a second opening at the second contact face; said second opening having substantially the same shape and dimensions as said first opening,
   the first coupling portion and the second coupling portion being configured to be self-guiding with respect to each other to align the respective openings thereof when the first contact face is brought into contact with the second contact face, whereby fluid communication is provided between the first and second coupling portions without creating a temperature change in a cryogenic fluid flowing therethrough; and
   a connector member for holding the first contact face in contact with the second contact face, wherein the connector member includes a biasing member that biases the first contact face into contact with the second contact face, wherein the biasing member is a spring,
   wherein the connector member further comprises a locking and unlocking mechanism for releasably holding the first coupling portion in locking engagement with the second coupling portion, and
   wherein the connector member further comprises
      an outer casing disposed around a main body of the second coupling portion;
      first and second support members attached to the outer casing;
      at least one guide rod extending between and supported by the first and second support members; and
      a slide member supported on the at least one guide rods;
      wherein the locking mechanism includes at least one protrusion disposed on an outer surface of the first coupling portion and at least one cut-out in one of the first and second support members for mating with the at least one protrusion;

wherein the spring is disposed around the main body of the second coupling portion and extends between the first and second support members, and wherein, when the contact face of the first coupling portion is contacted with the contact face of the second coupling portion, the at least one protrusion passes through the at least one cut-out and contacts with the slide member so that the slide member compresses the spring and, when the second coupling portion is then rotated with respect to the first coupling portion so that the at least one protrusion is no longer aligned with the at least one cut-out, the first coupling portion is held in locking engagement with the second coupling portion.

10. A method for coupling cryogenic fluid conduits, comprising:

providing first and second coupling portions formed of material having a low thermal conductivity and high resistivity to low temperatures;

contacting together contact faces of the first and second coupling portions, each having a fluid flow path with an opening at the respective contact face, the fluid flow paths of the first and second coupling portions being substantially equal in cross-sectional area, in such a way that the openings are aligned, whereby fluid communication is provided between the first and second coupling portions without creating a temperature change in a cryogenic fluid flowing therethrough; and releasably securing together the first and second coupling portions with a sliding connector to retain said contact faces in contact with one another.

11. The method of claim 10, wherein the contact faces of the first and second coupling portions are self-guiding with respect to each other and automatically align the openings thereof when brought into contact.

12. The method of claim 11, further comprising securing the first and second coupling portion together by rotating one with respect to the other.

13. The method of claim 11, wherein the first coupling portion includes a male connector portion which protrudes from the contact face such that the male connector portion forms a part of the contact face of the first coupling portion and wherein the second coupling portion includes a female connector portion which is recessed in the contact face such that the female connector portion forms a part of the contact face of the second coupling portion.

14. The method of claim 13, wherein the male connector portion is frustoconical.

15. The method of claim 10, further comprising continuously biasing the contact face of the first coupling portion in a direction of contact with the contact face of the second coupling portion.

16. The method of claim 15, wherein the biasing is accomplished by a spring.

* * * * *